(12) United States Patent
Ward

(10) Patent No.: US 8,812,179 B1
(45) Date of Patent: Aug. 19, 2014

(54) AMMONIA DETECTION

(75) Inventor: William Douglas Ward, Friendswood, TX (US)

(73) Assignee: The Boeing Company, Chicago, IL (US)

( * ) Notice: Subject to any disclaimer, the term of this patent is extended or adjusted under 35 U.S.C. 154(b) by 449 days.

(21) Appl. No.: 12/898,505

(22) Filed: Oct. 5, 2010

(51) Int. Cl.
*B64G 1/36* (2006.01)

(52) U.S. Cl.
USPC ............................................................ 701/13

(58) Field of Classification Search
None
See application file for complete search history.

(56) References Cited

U.S. PATENT DOCUMENTS

| | | | | |
|---|---|---|---|---|
| 4,785,666 | A | * | 11/1988 | Bergquist ........................ 73/40.7 |
| 6,444,011 | B2 | | 9/2002 | Li et al. |
| 6,499,696 | B1 | | 12/2002 | Malinowski |
| 6,888,910 | B1 | * | 5/2005 | Moriarty ........................ 376/367 |
| 2004/0168900 | A1 | | 9/2004 | Tung |
| 2006/0011844 | A1 | * | 1/2006 | Oka et al. ...................... 250/343 |
| 2006/0124195 | A1 | * | 6/2006 | Cohen et al. ..................... 141/94 |

OTHER PUBLICATIONS

"SINDA/FLUINT General Purpose Thermal/Fluid Network Analyzer, Version 4.1", Oct. 1998, Cullimore and Ring Technologies, Inc. Users Manual, pp. 1-859.
ATA-AD-TM-2009-002 Boeing Technical Memorandum, May 1, 2009, pp. 1-24.
ATA-AD-TM-2009-004 Boeing Technical Memorandum, May 29, 2009, pp. 1-68.
ATA-AD-TM-2009-008 Boeing Technical Memorandum, Aug. 4, 2009, pp. 1-5.
ATA-AD-IL-2010-004 Boeing Technical Memorandum, Mar. 4, 2010, pp. 1-24.

* cited by examiner

*Primary Examiner* — Thomas Tarcza
*Assistant Examiner* — Adam Alharbi
(74) *Attorney, Agent, or Firm* — Yee & Associates, P.C.

(57) ABSTRACT

The different advantageous embodiments provide for identifying gas leakage in a platform. A processor unit identifies a rate of the gas of the substance leaking from a container in a first compartment for a platform. The processor unit also identifies an amount of gas that has leaked from the container at a selected time based on the rate of the gas of the substance leaking from the container and a total time. The processor unit identifies an amount of the gas of the substance present in a number of compartments associated with the first compartment using the amount of gas leaked from the container in the first compartment and a pressure for each compartment in the number of compartments. The processor unit determines whether the amount of gas in at least one of the first compartment and the number of compartments is outside of a desired amount for the gas.

20 Claims, 6 Drawing Sheets

AMMONIA DETECTION

GOVERNMENT LICENSE RIGHTS

This invention was made with Government support under Boeing subcontract 6000132079 awarded by United Space Alliance under prime contract NNJ06VA01C awarded by NASA. The Government has certain rights in this invention.

BACKGROUND INFORMATION

1. Field

The present disclosure relates generally to substance detection and more particularly to identifying concentrations of ammonia. Still more particularly, the present disclosure provides a method and system for determining when an amount of ammonia is in a selected amount for a number of compartments.

2. Background

A spacecraft is a craft or machine designed for spaceflight. Spacecraft are used for a variety of purposes, including communications, earth observation, meteorology, navigation, planetary exploration and space tourism. Spacecraft are used to deliver materials and retrieve materials from the space station. Different materials may be retrieved for different reasons. However, one example is when the spacecraft is used to retrieve a container that is not working properly. The container may be an ammonia container. Containers of ammonia are used to supply cooling to different modules of the space station.

Each container has an attachment piece used to extract the ammonia. The attachment piece may allow ammonia to exit when not connected. The attachment piece may also allow ammonia to exit to an outside area even when connected. The ammonia that has exited the container may accumulate in different compartments of the spacecraft. The ammonia is not desirable when accumulated in a compartment with a certain concentration.

Current systems for determining the concentrations of ammonia only identify the concentration in the compartment where the container is located. These systems take the amount of ammonia that has been leaked and determine a concentration in the compartment. However, ammonia flows to other compartments as well. Therefore, the current systems do not have an accurate measurement of ammonia in the compartment.

Accordingly, it would be advantageous to have a method and apparatus, which takes into account one or more of the issues discussed above, as well as, possibly other issues.

SUMMARY

An advantageous embodiment of the present disclosure provides a method for identifying gas leakage in a platform. A processor unit identifies a rate of the gas of the substance leaking from a container in a first compartment for a platform. The processor unit also identifies an amount of gas that has leaked from the container at a selected time based on the rate of the gas of the substance leaking from the container and a total time. The processor unit identifies an amount of the gas of the substance present in a number of compartments associated with the first compartment using the amount of gas leaked from the container in the first compartment and a pressure for each compartment in the number of compartments. The processor unit determines whether the amount of gas in at least one of the first compartment and the number of compartments is outside of a desired amount for the gas.

Another advantageous embodiment of the present disclosure provides a data processing system for identifying gas leakage in a platform. The data processing system comprises a bus system, a storage device connected to the bus system, and a processing unit connected to the bus system. The storage device includes a set of instructions. The processor executes the set of instructions to identify a rate of the gas of the substance leaking from a container in a first compartment for a platform. The processor executes the set of instructions to identify an amount of gas that has leaked from the container at a selected time based on the rate of the gas of the substance leaking from the container and a total time. The processor executes the set of instructions to identify an amount of the gas of the substance present in a number of compartments associated with the first compartment using the amount of gas leaked from the container in the first compartment and a pressure for each compartment in the number of compartments. The processor executes the set of instructions to determine whether the amount of gas in at least one of the first compartment and the number of compartments is outside of a desired amount for the gas.

Another advantageous embodiment of the present disclosure provides a computer program product for identifying gas leakage in a platform. The computer program product comprises a computer recordable storage medium. The computer program product comprises program code, stored on the computer recordable storage medium, for identifying a rate of the gas of the substance leaking from a container in a first compartment for a platform. The computer program product comprises program code, stored on the computer recordable storage medium, for identifying an amount of gas that has leaked from the container at a selected time based on the rate of the gas of the substance leaking from the container and a total time. The computer program product comprises program code, stored on the computer recordable storage medium, for identifying an amount of the gas of the substance present in a number of compartments associated with the first compartment using the amount of gas leaked from the container in the first compartment and a pressure for each compartment in the number of compartments. The computer program product comprises program code, stored on the computer recordable storage medium, for determining whether the amount of gas in at least one of the first compartment and the number of compartments is outside of a desired amount for the gas.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
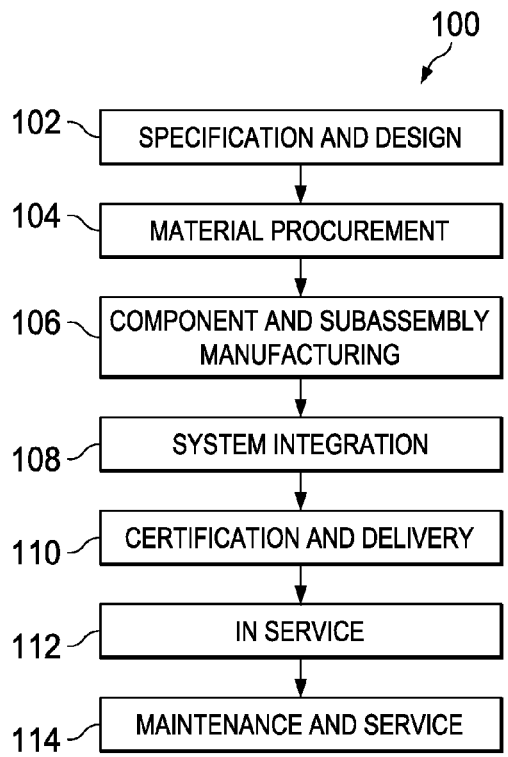
FIG. 1 is an illustration of a spacecraft manufacturing and service method in which an advantageous embodiment may be implemented.
Figure 2:
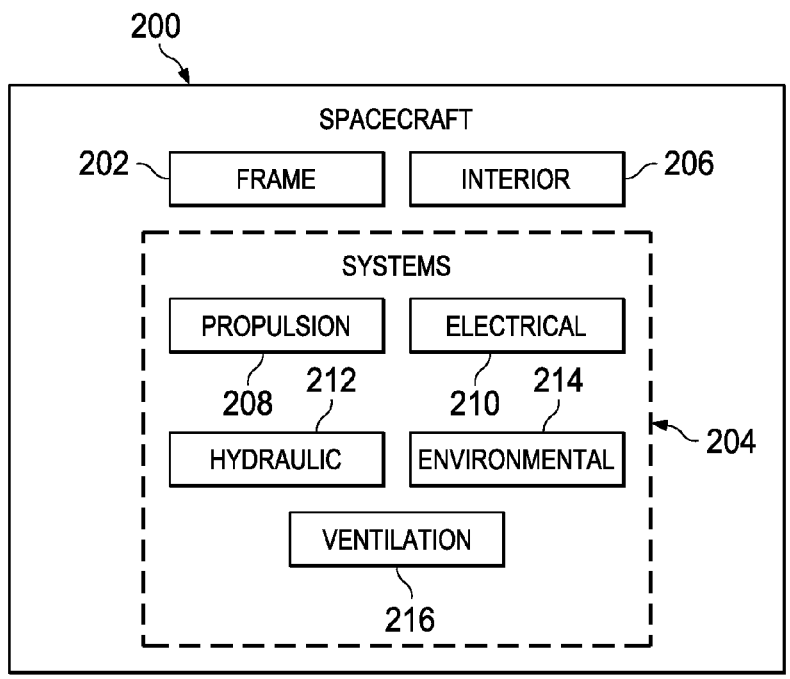
FIG. 2 is an illustration of a spacecraft in accordance with an advantageous embodiment.

Referring more particularly to the drawings, embodiments of the disclosure may be described in the context of spacecraft manufacturing and service method 100 as shown in FIG. 1 and spacecraft 200 as shown in FIG. 2. Turning first to FIG. 1, an illustration of an spacecraft manufacturing and service method is depicted in accordance with an advantageous embodiment. During pre-production, spacecraft manufacturing and service method 100 may include specification and design 102 of spacecraft 200 in FIG. 2 and material procurement 104.

During production, component and subassembly manufacturing 106 and system integration 108 of spacecraft 200 in FIG. 2 takes place. Thereafter, spacecraft 200 in FIG. 2 may go through certification and delivery 110 in order to be placed in service 112. While in service by a customer, spacecraft 200 in FIG. 2 is scheduled for routine maintenance and service 114, which may include modification, reconfiguration, refurbishment, and other maintenance or service.

Each of the processes of spacecraft manufacturing and service method 100 may be performed or carried out by a system integrator, a third party, and/or an operator. In these examples, the operator may be a customer. For the purposes of this description, a system integrator may include, without limitation, any number of spacecraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of a spacecraft is depicted in which an advantageous embodiment may be implemented. In this example, spacecraft 200 is produced by spacecraft manufacturing and service method 100 in FIG. 1 and may include frame 202 with a plurality of systems 204 and interior 206. Examples of plurality of systems 204 include one or more of propulsion system 208, electrical system 210, hydraulic system 212, environmental system 214, and ventilation system 216. Any number of other systems may be included. One or more of these systems may be integrated and/or used in conjunction with one or more other systems. For example, ventilation system 216 may be powered by electrical system 210, in one illustrative example. Although an aerospace example is shown, different advantageous embodiments may be applied to other industries, such as the automotive industry, marine vessel industry, military, and/or any other suitable industry.

Apparatus and methods embodied herein may be employed during at least one of the stages of spacecraft manufacturing and service method 100 in FIG. 1. For example, the different advantageous embodiments may be implemented during routine maintenance and service 114 of spacecraft 200 in FIG. 2.

In one illustrative example, components or subassemblies produced in component and subassembly manufacturing 106 in FIG. 1 may be fabricated or manufactured in a manner similar to components or subassemblies produced while spacecraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. As used herein, the phrase "a number of", when referring to items means, one or more items. For example, a number of apparatus embodiments is one or more apparatus embodiments. A number of apparatus embodiments, method embodiments, or a combination thereof may be utilized while spacecraft 200 is in service 112 and/or during maintenance and service 114 in FIG. 1. The use of a number of the different advantageous embodiments may substantially expedite the assembly of and/or reduce the cost of spacecraft 200.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

As used herein, when a first component is connected to a second component, the first component may be connected to the second component without any additional components. The first component also may be connected to the second component by one or more other components. For example, one electronic device may be connected to another electronic device without any additional electronic devices between the first electronic device and the second electronic device. In some cases, another electronic device may be present between the two electronic devices connected to each other.

The different advantageous embodiments recognize and take into account a number of different considerations. For example, the different advantageous embodiments recognize and take into account that current systems and methods for identifying ammonia leakage in a spacecraft do not account for the different compartments and areas in the spacecraft. The ammonia leaks to the different compartments which have different pressurizations.

The different advantageous embodiments further recognize and take into account that current methods of identifying flow rate into an area of leakage for ammonia use only a single state of the ammonia in identifying flow rates and the amount of substance released into the area.

Thus, the different advantageous embodiments provide a method, data processing system, and computer program product for identifying gas leakage in a platform. A processor unit identifies a rate of the gas of the substance leaking from a container in a first compartment for a platform. The processor unit also identifies an amount of gas that has leaked from the container at a selected time based on the rate of the gas of the substance leaking from the container and a total time. The processor unit also identifies an amount of the gas of the substance present in a number of compartments associated with the first compartment using the amount of gas leaked from the container in the first compartment and a pressure for each compartment in the number of compartments. The processor unit also determines whether the amount of gas in at least one of the first compartment and the number of compartments is outside of a desired amount for the gas.

Figure 3:
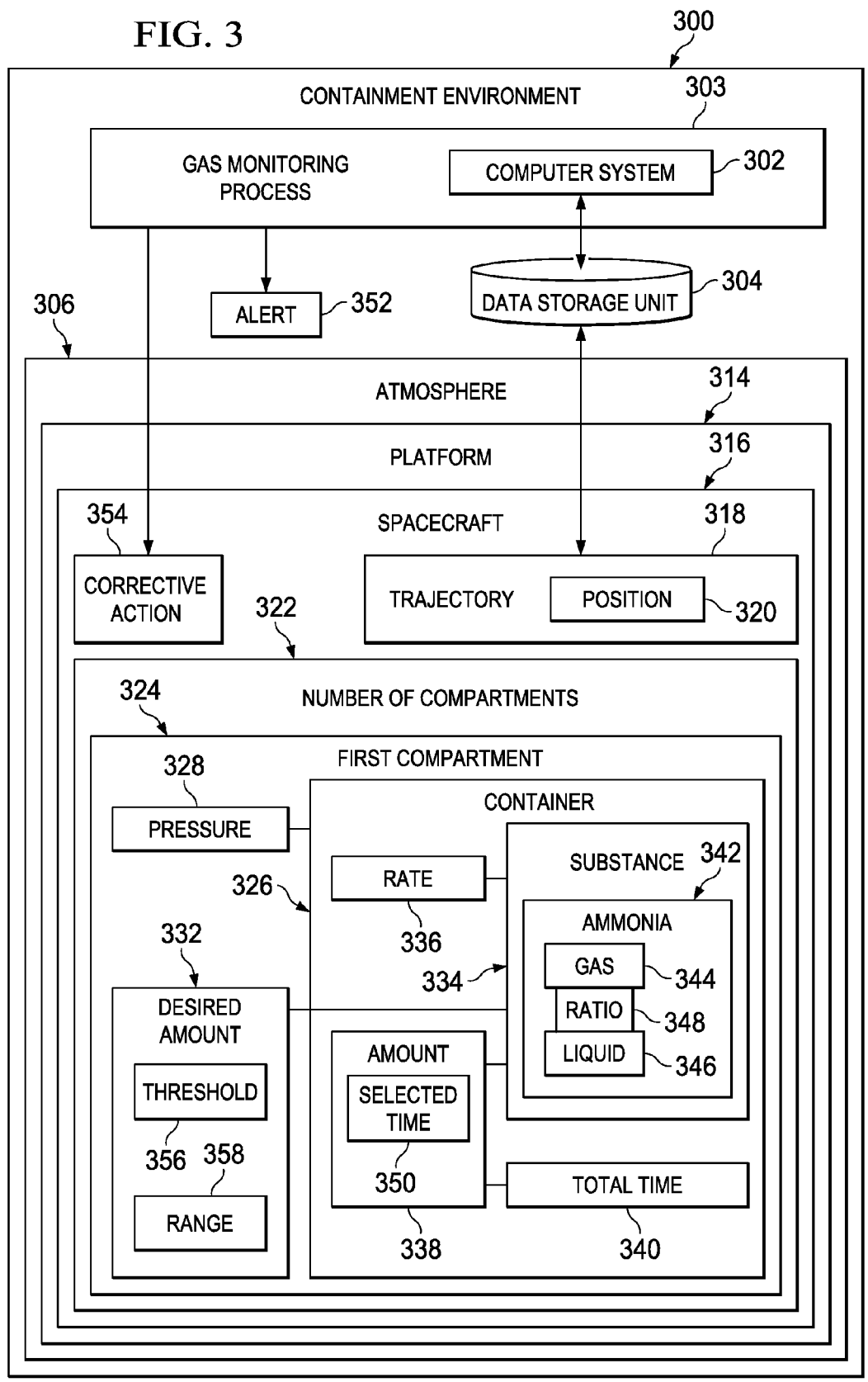
FIG. 3 is an illustration of a containment environment depicted in accordance with an advantageous embodiment.

With reference now to FIG. 3, an illustration of a containment environment depicted in accordance with an advantageous embodiment. Containment environment 300 may be implemented in a component such as spacecraft 200 in FIG. 2, for example.

Containment environment 300 may be any type of environment where containment of a substance is performed, for example. Containment environment 300 includes computer system 302, data storage unit 304, and atmosphere 306.

Computer system 302 is a number of computers. When more than one computer is present in computer system 302, the computers may communicate with each other using a network, wireless communications links, and other type of communications mechanisms. In these examples, gas monitoring process 303 runs on computer system 302.

Computer system 302 may be a number of processors, a multi-processor core, or some other type of processor, depending on the particular implementation. A number, as used herein with reference to an item, means one or more items.

Data storage unit 304 may be a hard drive, a flash memory, a rewritable optical disk, a rewritable magnetic tape, or some combination of the above. Data storage unit 304 may store different data used by computer system 302.

Atmosphere 306 may be space, the Earth's atmosphere, a body of water, or a combination thereof. Atmosphere 306 includes platform 314. Platform 314 may be a type of vehicle, spacecraft 316, spacecraft, tank, water vehicle, type of building, or some other type of area.

Spacecraft 316 has number of compartments 322. Spacecraft 316 has trajectory 318. Spacecraft 316 may be a vehicle used to transport materials to a space station. Spacecraft 316 may also transport materials back from the space station. Spacecraft 316 may be used for other types of mission as well.

For example, trajectory 318 may be the route or flight path for spacecraft 316. Trajectory 318 may be predetermined or calculated during flight. Trajectory 318 may be a route from a space station to a home base or landing site. Trajectory 318 includes position 320. Position 320 is a certain point in trajectory 318 for spacecraft 316. In different embodiments, position 320 is a range on trajectory 318.

Number of compartments 322 may be different compartments and areas in spacecraft 316. Each compartment of number of compartments 322, such as first compartment 324, may be a portion of spacecraft 316 that is partially closed off to other portions of spacecraft 316. Partially closed off may mean that movement of gasses between number of compartments 322 is substantially restricted. In different advantageous embodiments, number of compartments 322 may be determined by some other manner. For example, first compartment 324 may be the inside of a wing, the payload bay of spacecraft 316, or some other area.

First compartment 324 may include container 326, pressure 328, and desired amount 332. Container 326 may be an object used to hold substance 334. Container 326 may also be a tank used to deliver substance 334. Container 326 may include a nozzle which releases substance 334 at rate 336. Rate 336 may change depending on the condition of the nozzle.

Container 326 includes substance 334, rate 336 of substance 334 exiting container 326, amount 338 of substance 334 that has exited container 326, and total time 340 that substance 334 has been exiting container 326. Substance 334 may be any type of chemical, gas, or liquid. In an advantageous embodiment, substance 334 is ammonia 342. In different advantageous embodiments, substance 334 may be another chemical, such as, for example, a chemical used to provide coolant to spacecraft 316. In other advantageous embodiments, substance 334 may be a chemical which is flammable or corrosive. Gas monitoring process 303 performs a process to monitor the distribution of substance 334 among number of compartments 322.

Ammonia 342 may be in state 343 of gas 344 or liquid 346. State 343 is the form that different phases of matter take on. Container 326 may include ammonia 342 in both the form of gas 344 and liquid 346 or just one these forms. When both gas 344 and liquid 346 are present, container 326 has ratio 348 of gas 344 to liquid 346. Ammonia 342 may exit container 326 at rate 336. Amount 338 of ammonia 342 may be the quantity of ammonia 342 exited from container 326 at selected time 350. Total time 340 is the amount 338 of time ammonia 342 has exited container 326.

Based on pressure 328, amount 338 of ammonia 342 is allowed into first compartment 324. Amount 338 may be desired amount 332 or not. When amount 338 is not desired amount 332, computer system 302 may generate alert 352. Alert 352 may be a audible alert, visual alert, record made, printout, or some other type of alert. In different advantageous embodiments, computer system 302 may perform corrective action 354. Corrective action 354 may be a change of direction, a cancellation of a mission, a design change or some other type of corrective action. Desired amount 332 may be threshold 356 or range 358.

The advantageous embodiments provide that with gas monitoring process 303 running on computer system 302, identification of undesired amounts of ammonia 342 in a number of compartments is possible.

The illustration of containment environment 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments. For example, spacecraft 316 may be separate from platform 314. In different advantageous embodiments, there may be multiple platforms and/or spacecrafts.

Figure 4:
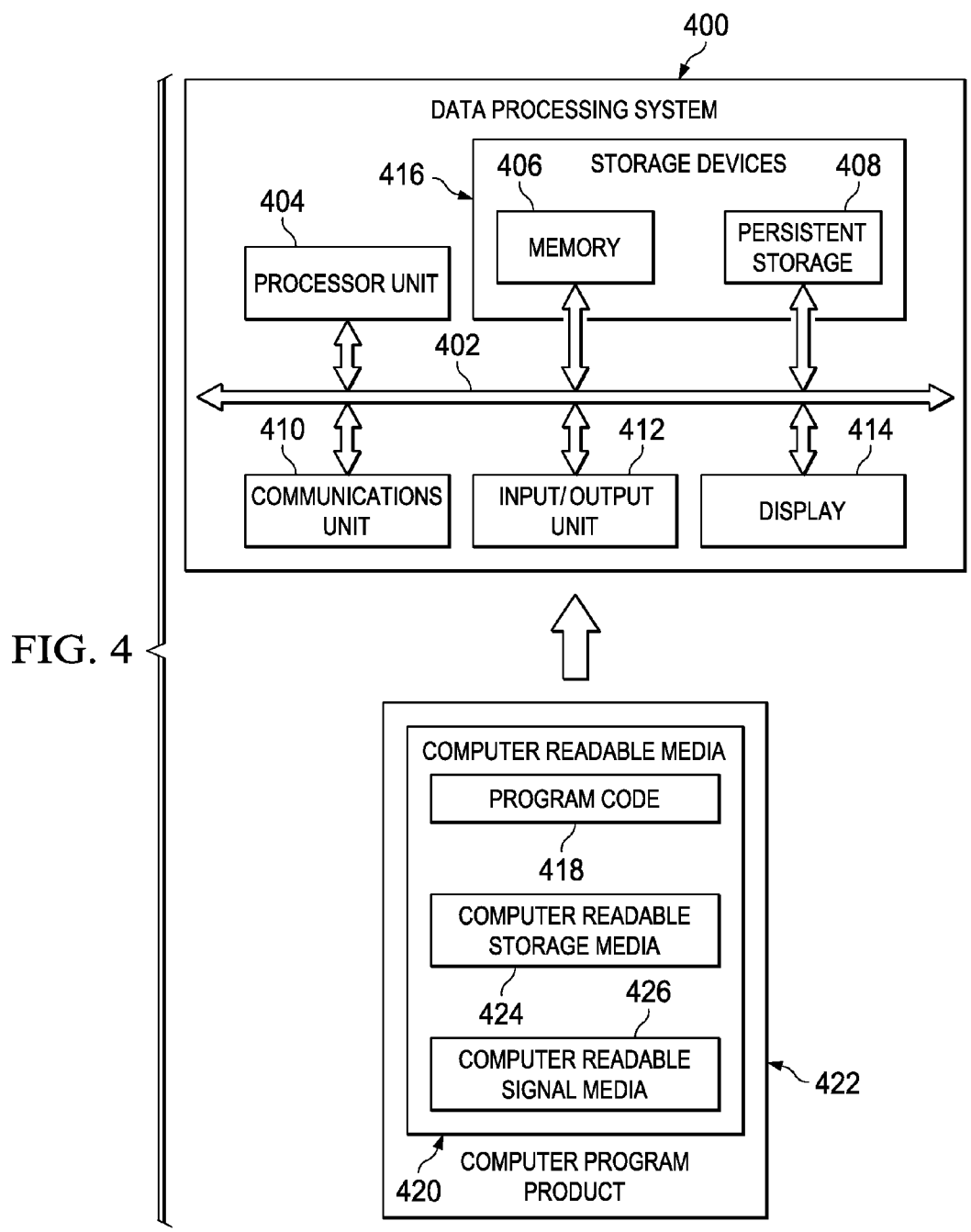
FIG. 4 is an illustration of a data processing system depicted in accordance with an advantageous embodiment.

Turning now to FIG. 4, an illustration of a data processing system is depicted in accordance with an advantageous embodiment. In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a number of processors, a multi-processor core, or some other type of processor, depending on the particular implementation. A number, as used herein with reference to an item, means one or more items. Further, processor unit 404 may be implemented using a number of heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example, without limitation, data, program code in functional form, and/or other suitable information either on a temporary basis and/or on a permanent basis. Storage devices 416 may also be referred to as computer readable storage devices in these examples. Memory 406, in these examples, may be, for example, a random access memory or any other suitable volatile or non-volatile storage device. Persistent storage 408 may take various forms, depending on the particular implementation.

For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications, and/or programs may be located in storage devices 416, which are in communication with processor unit 404 through communications fabric 402. In these illustrative examples, the instructions are in a functional form on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer usable program code, or computer readable program code that may be read and executed by a processor in processor unit 404. The program code in the different embodiments may be embodied on different physical or computer readable storage media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 422 in these examples. In one example, computer readable media 420 may be computer readable storage media 424 or computer readable signal media 426. Computer readable storage media 424 may include, for example, an optical or magnetic disk that is inserted or placed into a drive or other device that is part of persistent storage 408 for transfer onto a storage device, such as a hard drive, that is part of persistent storage 408. Computer readable storage media 424 also may take the form of a persistent storage, such as a hard drive, a thumb drive, or a flash memory, that is connected to data processing system 400. In some instances, computer readable storage media 424 may not be removable from data processing system 400. In these illustrative examples, computer readable storage media 424 is a non-transitory computer readable storage medium.

Alternatively, program code 418 may be transferred to data processing system 400 using computer readable signal media 426. Computer readable signal media 426 may be, for example, a propagated data signal containing program code 418. For example, computer readable signal media 426 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 418 may be downloaded over a network to persistent storage 408 from another device or data processing system through computer readable signal media 426 for use within data processing system 400. For instance, program code stored in a computer readable storage medium in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different advantageous embodiments may be implemented in a data processing system including components in addition to or in place of those illustrated for data processing system 400. Other components shown in FIG. 4 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 404 may take the form of a hardware unit that has circuits that are manufactured or configured for a particular use. This type of hardware may perform operations without needing program code to be loaded into a memory from a storage device to be configured to perform the operations.

For example, when processor unit 404 takes the form of a hardware unit, processor unit 404 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 418 may be omitted because the processes for the different embodiments are implemented in a hardware unit.

In still another illustrative example, processor unit 404 may be implemented using a combination of processors found in computers and hardware units. Processor unit 404 may have a number of hardware units and a number of processors that are configured to run program code 418. With this depicted example, some of the processes may be implemented in the number of hardware units, while other processes may be implemented in the number of processors.

As another example, a storage device in data processing system 400 is any hardware apparatus that may store data. Memory 406, persistent storage 408, and computer readable media 420 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406, or a cache, such as found in an interface and memory controller hub that may be present in communications fabric 402.

Figure 5:
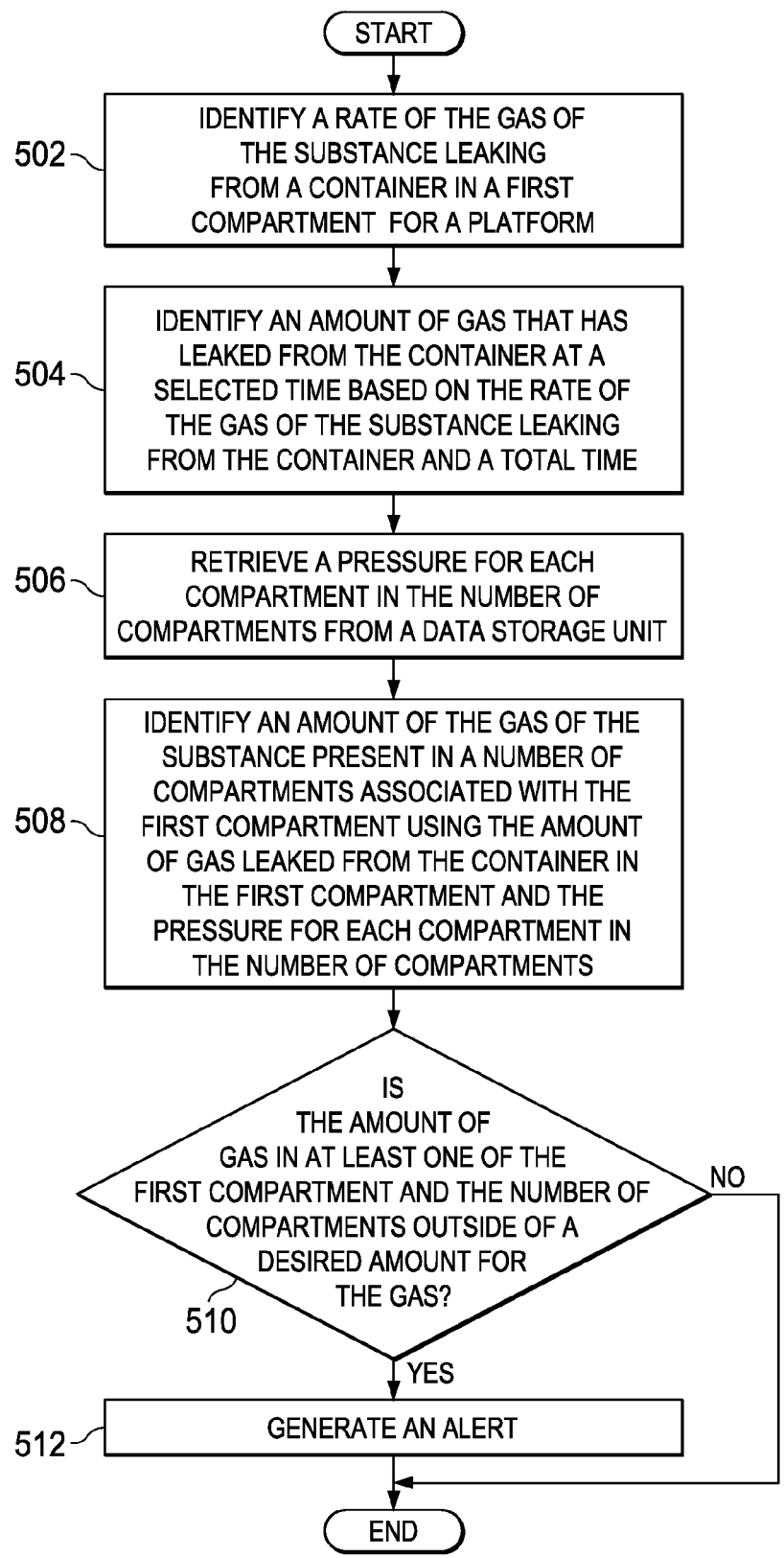
FIG. 5 is an illustration of a flowchart illustrating a process for identifying a concentration of a substance within a number of compartments depicted in accordance with an advantageous embodiment.

With reference now to FIG. 5, an illustration of a flowchart illustrating a process for identifying a concentration of a substance within a number of compartments is depicted in accordance with an advantageous embodiment. The process in FIG. 5 may be implemented by a component such as computer system 302 in FIG. 3, for example.

The process begins by identifying a rate of the gas of the substance leaking from a container in a first compartment for a platform (operation 502). Operation 502 may comprise identifying a ratio of a liquid of the substance to the gas of the substance in the container. Operation 502 may also comprise identifying the rate of the gas leaking from the container based on the ratio.

The process then identifies an amount of gas that has leaked from the container at a selected time based on the rate of the gas of the substance leaking from the container and a total time (operation 504). The process then retrieves a pressure for each compartment in the number of compartments from a data storage unit (operation 506). The number of compartments is configured to allow air to flow between the number of compartments.

The process also identifies an amount of the gas of the substance present in a number of compartments associated with the first compartment using the amount of gas leaked from the container in the first compartment and the pressure for each compartment in the number of compartments (operation 508). The number of compartments may be within a spacecraft. Operation 508 may comprise identifying a position in a trajectory of the spacecraft in an atmosphere.

The process then determines whether the amount of gas in at least one of the first compartment and the number of compartments is outside of a desired amount for the gas (operation 510). The desired amount for each compartment may be the range in which a concentration of ammonia is flammable. The desired amount for the gas may be a threshold or a range. The process generates an alert in response to the amount of gas in at least one of the first compartment and the number of compartments is outside of the desired amount for the gas (operation 512). Alternatively, in different advantageous embodiments, the process performs a corrective action in response to the amount of gas in at least one of the first compartment and the number of compartments is outside of the desired amount for the gas. Thereafter, the process terminates.

Figure 6A:
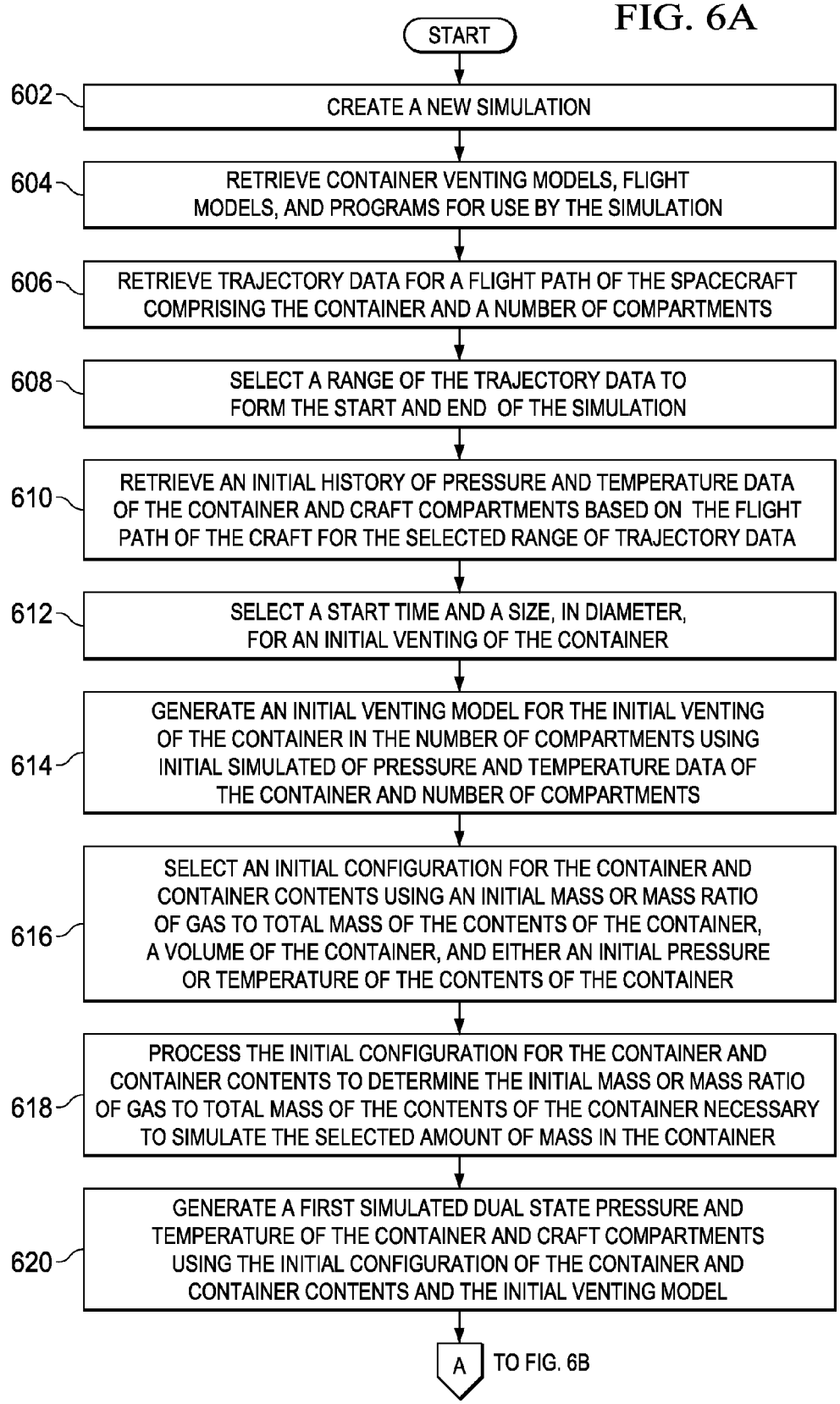
FIGS. 6A-6B are an illustration of a flowchart illustrating a process for identifying a concentration of a substance within a number of compartments depicted in accordance with an advantageous embodiment.
Figure 6B:
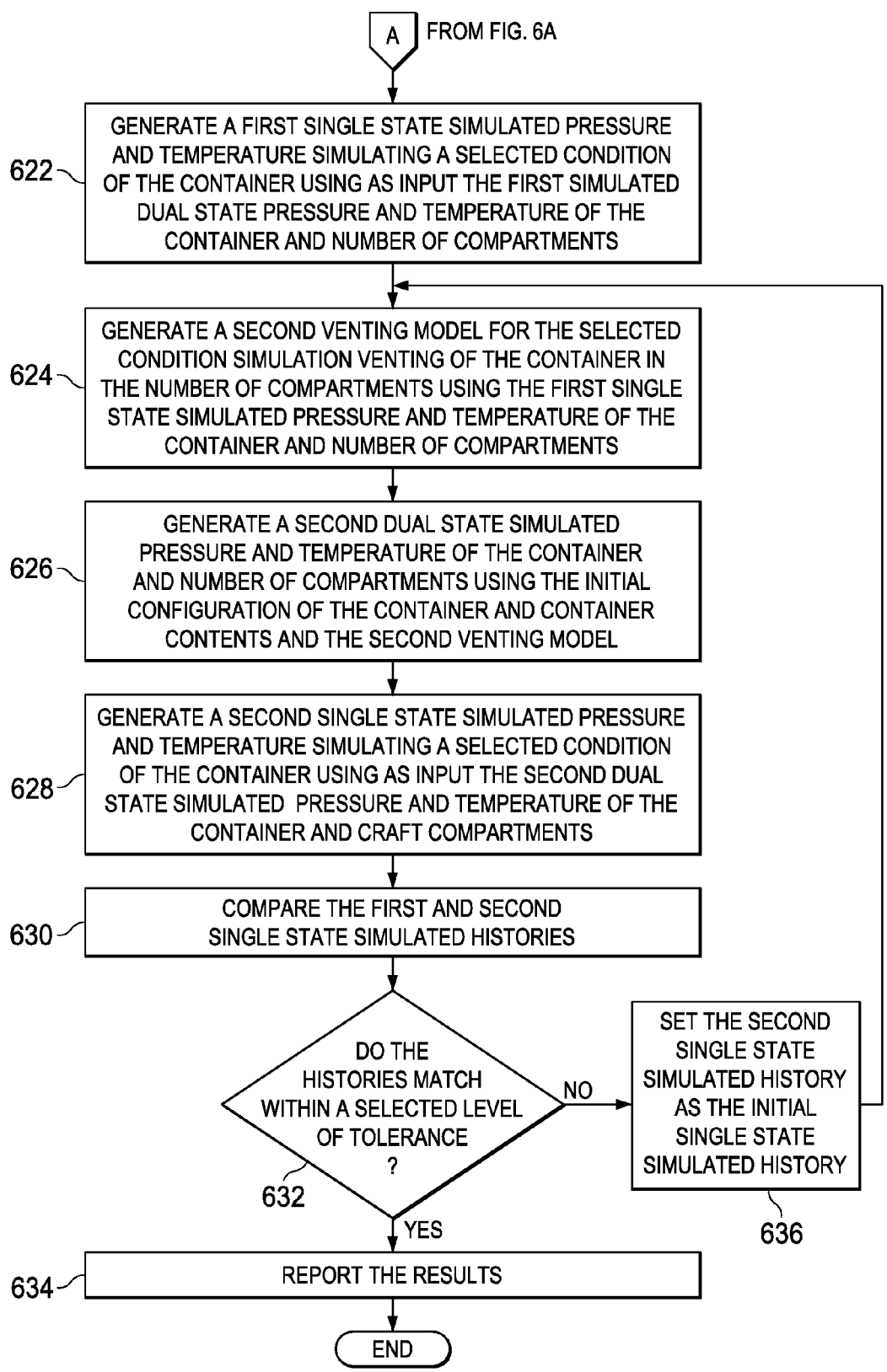

With reference now to FIG. 6, an illustration of a flowchart illustrating a process for identifying a concentration of a substance within a number of compartments is depicted in accordance with an advantageous embodiment. The process in FIG. 6 may be implemented by a component such as computer system 302 in FIG. 3, for example.

The process begins by creating a new simulation (operation 602). The simulation includes the arrangement of how variables that will be input in the simulation will interact with one another. The simulation uses processes and equations used to calculate rate of flow for fluids and substances. In different advantageous embodiments, the simulation may be a programming language working directory, such as a UNIX® working directory.

The process then retrieves container venting models, flight models, and programs for use by the simulation (operation 604). Container venting models include the data for initial venting of the container with a substance. Flight models include the data for flight trajectories and venting for different compartments in the spacecraft.

The process then retrieves trajectory data for a flight path of the spacecraft comprising the container and a number of compartments (operation 606). The trajectory data includes the predicted and/or actual trajectory of the spacecraft. The trajectory data also includes initial pressures for each compartment of the number of compartments during every position of the trajectory.

The process then selects a range of the trajectory data to form the start and end of the simulation (operation 608). The start and the end of the simulation may a desired range of the trajectory where pressures in the different compartments are desired. The start and end of the simulation may also indicate a range of the trajectory that includes points of the trajectory where different compartments have shown selected amounts of a substance. The substance may be any type of chemical or substance. For example, the substance may be ammonia. The substance may be in gas, liquid, or a combination of both.

The process then retrieves an initial history of pressure and temperature data of the container and craft compartments based on the flight path of the craft for the selected range of trajectory data (operation 610). In operation 610, a history of pressure and temperature data is used. The history is from past flights by similar spacecraft. The pressure and temperature data is the pressure and temperature of the container and each compartment for different points along the flight path for the spacecraft. Operation 610 may be all or part of operation 506 in FIG. 5.

The process then selects a start time and a size, in diameter, for an initial venting of the container (operation 612). Initial venting may be the venting of the ammonia from the container under initial pressures and conditions. Initial pressures and conditions may be pressures and conditions in which the container operates. The container may operate by providing thermal cooling to compartments of the spacecraft.

The process then generates an initial venting model for the initial venting of the container in the number of compartments using initial simulated pressure and temperature data of the container and number of compartments (operation 614). The initial venting model is for container contents comprising ammonia in states of liquid and/or gas. Gas may also be referred to as vapor. Operation 614 may be all or part of operations 502 and 504 in FIG. 5.

The process then selects an initial configuration for the container and container contents using an initial mass or mass ratio of gas to total mass of the contents of the container, a volume of the container, and either an initial pressure or temperature of the contents of the container (operation 616). Either the mass or the mass ratio is given and the other is calculated thereafter. The process then processes the initial configuration for the container and container contents to determine the initial mass or mass ratio of gas to total mass of the contents of the container necessary to simulate the selected amount of mass in the container (operation 618).

The process then generates a first simulated dual state pressure and temperature of the container and craft compartments using the initial configuration of the container and container contents and the initial venting model (operation 620). Dual state means the gas and liquid components are both generated. Pressure and temperature data is for the container and each compartment in the craft. Operation 620 may be all or part of operation 508 in FIG. 5.

The process then generates a first single state simulated pressure and temperature of the container simulating a selected condition of the container using as input the first simulated dual state pressure and temperature of the container and number of compartments, (operation 622). The simulation program may only support estimating the pressure and temperature using a single state of ammonia and not both the liquid and vapor states of ammonia. In these illustrative embodiments, the vapor state may be used. In different illustrative embodiments, the liquid state may be used. Pressure and temperature data is for the container and each compartment in the craft.

The process then generates a second venting model for the selected condition simulation venting of the container in the number of compartments using the first single state simulated pressure and temperature of the container and number of compartments (operation 624). The venting model is for container contents comprising a substance such as ammonia in liquid and vapor states. The venting model is second because it is a new venting model after the initial venting model. Operation 624 may be all or part of operations 502 and 504 in FIG. 5.

The process then generates a second dual state simulated pressure and temperature of the container and number of compartments using the initial configuration of the container and container contents and the second venting model (operation 626). Operation 626 may be all or part of operation 508 in FIG. 5. The process then generates a second single state simulated pressure and temperature of the container simulating a selected condition of the container using as input the second dual state simulated pressure and temperature of the container and craft compartments (628).

The process then compares the first and second single state simulated histories (operation 630). The process then determines whether the histories match within a selected level of tolerance (operation 632). The selected level of tolerance may be chosen by a user, the processor unit, a policy of rules, or some other method. Operations 630 and 632 may be all or part of operation 510 in FIG. 5. If the histories do match within a selected level of tolerance, the process reports the results (operation 634). Thereafter, the process terminates. The results may be reported in any manner such as, for example, on a computer display screen, a printed report, using alerts, corrective actions, and/or another type of report. Operation 634 may be one example of one implementation of operation 512 in FIG. 5.

If the histories do not match within the selected level of tolerance, the process sets the second single state simulated history as the initial single state simulated history and goes back to operation 624 (operation 636). The repeated operations of 624-628 may further generate a more accurate set of results.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments provide for identifying gas leakage in a platform. A processor unit identifies a rate of the gas of the substance leaking from a container in a first compartment for a platform. The processor unit also identifies an amount of gas that has leaked from the container at a selected time based on the rate of the gas of the substance leaking from the container and a total time. The processor unit identifies an amount of the gas of the substance present in a number of compartments associated with the first compartment using the amount of gas leaked from the container in the first compartment and a pressure for each compartment in the number of compartments. The processor unit determines whether the amount of gas in at least one of the first compartment and the number of compartments is outside of a desired amount for the gas.

The different advantageous embodiments provide for identifying different concentrations of ammonia in different compartments of a spacecraft. The different compartments may be flammable for different concentrations.

The different advantageous embodiments further provide for a more accurate determination of ammonia in the different compartments that current systems. The advantageous embodiments provide for using a dual state input to determine the flow rate of the container. Using a dual state input allows for more accurate outputs.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for identifying gas leakage in a platform, the method comprising:
   identifying, by a processor unit, a rate of the gas of the substance leaking from a container in a first compartment for the platform;
   identifying an amount of gas that has leaked from the container at a selected time based on the rate of the gas of the substance leaking from the container and a total time;
   identifying a position in a trajectory of the platform in an atmosphere;
   identifying an amount of the gas of the substance present in a number of compartments associated with the first compartment using the amount of gas leaked from the container in the first compartment and a pressure for each compartment in the number of compartments, the pressure determined using data associated with the position in the trajectory; and
   determining whether the amount of gas in at least one of the first compartment and the number of compartments is outside of a desired amount for the gas of the substance.

2. The method of claim 1, further comprising:
   generating an alert responsive to the amount of gas in at least one of the first compartment and the number of compartments being outside of the desired amount for the gas.

3. The method of claim 1, further comprising:
   performing a corrective action responsive to the amount of gas in at least one of the first compartment and the number of compartments being outside of the desired amount for the gas.

4. The method of claim 1, wherein the desired amount is a threshold.

5. The method of claim 1, wherein the desired amount is a range.

6. The method of claim 1, wherein the substance is ammonia.

7. The method of claim 1, wherein the step of identifying, by the processor unit, the rate of the gas of the substance leaking from the container in the first compartment for the platform comprises:
   identifying a ratio of a liquid of the substance to the gas of the substance in the container; and
   identifying the rate of the gas leaking from the container based on the ratio.

8. The method of claim 1, wherein the step of identifying a position in a trajectory of the platform in an atmosphere includes selecting a range of the trajectory and retrieving a history of temperature and pressure data based on the range of the trajectory, and further comprising:
   indicating when a concentration of the gas in each compartment of the number of compartments is within a selected range for each compartment of the number of compartments.

9. The method of claim 1, wherein the desired amount for each compartment is the range in which a concentration of ammonia is flammable.

10. The method of claim 1, wherein the number of compartments are configured to allow air to flow between the number of compartments.

11. The method of claim 1, wherein the platform is a spacecraft.

12. The method of claim 11, wherein the number of compartments is within the spacecraft, and wherein the step of identifying the pressure for each compartment in the number of compartments includes:
   identifying a position in a trajectory of the spacecraft in an atmosphere.

13. The method of claim 1, further comprising:
   retrieving the pressure for each compartment in the number of compartments from a data storage unit.

14. A data processing system for identifying gas leakage in a platform, the data processing system comprising:
   a bus system;
   a storage device connected to the bus system, wherein the storage device includes a set of instructions; and
   a processing unit connected to the bus system in communication with the storage device, wherein the processing unit executes the set of instructions to
      identify a rate of the gas of the substance leaking from a container in a first compartment for the platform;
      identify an amount of gas that has leaked from the container at a selected time based on the rate of the gas of the substance leaking from the container and a total time;
      identifying a position in a trajectory of the platform in an atmosphere;
      identify an amount of the gas of the substance present in a number of compartments associated with the first compartment using the amount of gas leaked from the container in the first compartment and a pressure for each compartment in the number of compartments, the pressure determined using data associated with the position in the trajectory; and
      determine whether the amount of gas in at least one of the first compartment and the number of compartments is outside of a desired amount for the gas of the substance.

15. The data processing system of claim 14, further comprising:
   the processing unit executes the set of instructions to generate an alert in response to the amount of gas in at least one of the first compartment and the number of compartments is outside of the desired amount for the gas.

16. The data processing system of claim 14, further comprising:
   the processing unit executes the set of instructions to perform a corrective action in response to the amount of gas in at least one of the first compartment and the number of compartments is outside of the desired amount for the gas.

17. The data processing system of claim 14, wherein the desired amount for each compartment is the range in which a concentration of ammonia is flammable.

18. The data processing system of claim 14, wherein the number of compartments are configured to allow air to flow between the number of compartments.

19. The data processing system of claim 14, further comprising:
   the processing unit executes the set of instructions to retrieve the pressure for each compartment in the number of compartments from a data storage unit.

20. A computer program product for identifying gas leakage in a platform, the computer program product comprising:
   a non-transitory computer recordable storage medium;
   program code, stored on the computer recordable storage medium, for identifying a rate of the gas of the substance leaking from a container in a first compartment for the platform;
   program code, stored on the computer recordable storage medium, for identifying an amount of gas that has leaked from the container at a selected time based on the rate of the gas of the substance leaking from the container and a total time;
   program code, stored on the computer readable storage medium, for identifying a position in a trajectory of the platform in an atmosphere;
   program code, stored on the computer recordable storage medium, for identifying an amount of the gas of the substance present in a number of compartments associated with the first compartment using the amount of gas leaked from the container in the first compartment and a pressure for each compartment in the number of compartments, the pressure determined using data associated with the position in the trajectory;
   program code, stored on the computer recordable storage medium, for determining whether the amount of gas in at least one of the first compartment and the number of compartments is outside of a desired amount for the gas.

* * * * *